United States Patent
Yamanaka

(10) Patent No.: US 9,247,118 B2
(45) Date of Patent: Jan. 26, 2016

(54) STEPPING MOTOR CONTROL UNIT, STEPPING MOTOR CONTROLLING METHOD, AND OPTICAL APPARATUS

(71) Applicant: CANON KABUSHIKI KAISHA, Tokyo (JP)

(72) Inventor: Tomoaki Yamanaka, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 29 days.

(21) Appl. No.: 14/319,458

(22) Filed: Jun. 30, 2014

(65) Prior Publication Data

US 2015/0022709 A1   Jan. 22, 2015

(30) Foreign Application Priority Data

Jul. 19, 2013   (JP) ................... 2013-149988

(51) Int. Cl.
- H04N 5/232 (2006.01)
- G03B 3/10 (2006.01)
- G03B 13/34 (2006.01)
- G02B 7/28 (2006.01)

(52) U.S. Cl.
CPC ............... H04N 5/232 (2013.01); G02B 7/282 (2013.01); G03B 3/10 (2013.01); G03B 13/34 (2013.01); H04N 5/23212 (2013.01); H04N 5/23216 (2013.01)

(58) Field of Classification Search
None
See application file for complete search history.

(56) References Cited

U.S. PATENT DOCUMENTS

| | | | | |
|---|---|---|---|---|
| 2010/0097020 A1* | 4/2010 | Kiyamura | ................. | H02P 6/14 318/400.11 |
| 2014/0176037 A1* | 6/2014 | Yoshimuta | ............... | G05B 1/03 318/632 |
| 2014/0368676 A1* | 12/2014 | Yoshimuta | ............... | H02P 8/22 348/207.99 |

FOREIGN PATENT DOCUMENTS

| | | |
|---|---|---|
| JP | 10-150798 A | 6/1998 |
| JP | 2002-148502 A | 5/2002 |

* cited by examiner

*Primary Examiner* — Justin P Misleh
(74) *Attorney, Agent, or Firm* — Rossi, Kimms & McDowell LLP

(57) ABSTRACT

A control unit for a stepping motor includes an encoder and a controller. The controller controls the stepping motor based on information sent from an image pickup apparatus configured to capture an object via an image pickup optical system that includes the focus lens. in a case that the image pickup apparatus performs autofocusing in capturing a still image, the controller open-loop-controls the stepping motor in at least one of a drive start period and a drive stop period of the stepping motor, and feedback-controls the stepping motor using an output of the encoder between the drive start period and the drive stop period of the stepping motor. The controller open-loop-controls the stepping motor in a case that the image pickup apparatus performs the autofocusing in capturing a motion image.

19 Claims, 9 Drawing Sheets

STEPPING MOTOR CONTROL UNIT, STEPPING MOTOR CONTROLLING METHOD, AND OPTICAL APPARATUS

BACKGROUND OF THE INVENTION

1. Field of the Invention

The present invention relates to a control unit for a stepping motor including an encoder, a method of controlling the stepping motor, and an optical apparatus.

2. Description of the Related Art

A stepping motor is characterized in that its position is easily controllable without a position detector because the stepping motor is rotatable every predetermined angle by switching the excitation to a coil. For this reason, an open-loop control is generally used to drive the stepping motor, which switches the excitation to the coil according to a predetermined time interval. However, disadvantageously, when it is driven at a high velocity or bears a heavy load, a rotor may fail to respond to the excitation switching to the coil, thereby it is likely to step out.

Japanese Patent Laid-Open No. ("JP") 10-150798 proposes a method for switching an open-loop control and a feedback control (closed-loop control) according to a movement amount, by including an encoder in a stepping motor. JP 2002-148502 proposes a method for switching a motor exciting method in an interchangeable lens type image pickup apparatus according to a type of the image pickup apparatus to be attached. In addition, the micro step driving that applies a sine wave to a motor driving waveform is a known driving method for reducing driving noises and for precisely positioning the stepping motor.

It is difficult to feedback-control a stepping motor with an encoder in the entire velocity range from the low velocity to the high velocity while the positioning accuracy is maintained, and driving vibrations and noises are reduced. Moreover, since a necessary motor characteristic is different in an image pickup apparatus according to a capture mode such as a still image capture mode and a motion image capture mode, an appropriate motor control is necessary for each capture mode. Furthermore, the necessary motor characteristic is different according to a focusing type, such as autofocusing and manual focusing.

SUMMARY OF THE INVENTION

The present invention provides a stepping motor control unit, a stepping motor control method, and an optical apparatus, which can properly control a stepping motor according to a pair of a capture mode and a lens operating mode.

A control unit for a stepping motor configured to drive a focus lens according to the present invention includes an encoder configured to detect a rotational position of the stepping motor, and a controller. The controller controls the stepping motor based on information sent from an image pickup apparatus configured to capture an object via an image pickup optical system that includes the focus lens. When the image pickup apparatus performs autofocusing in capturing a still image, the controller open-loop-controls the stepping motor in at least one of a drive start period and a drive stop period of the stepping motor, and feedback-controls the stepping motor using an output of the encoder between the drive start period and the drive stop period of the stepping motor. The controller open-loop-controls the stepping motor when the image pickup apparatus performs the autofocusing in capturing a motion image.

Further features of the present invention will become apparent from the following description of exemplary embodiments with reference to the attached drawings.

DESCRIPTION OF THE EMBODIMENTS

Figure 1:
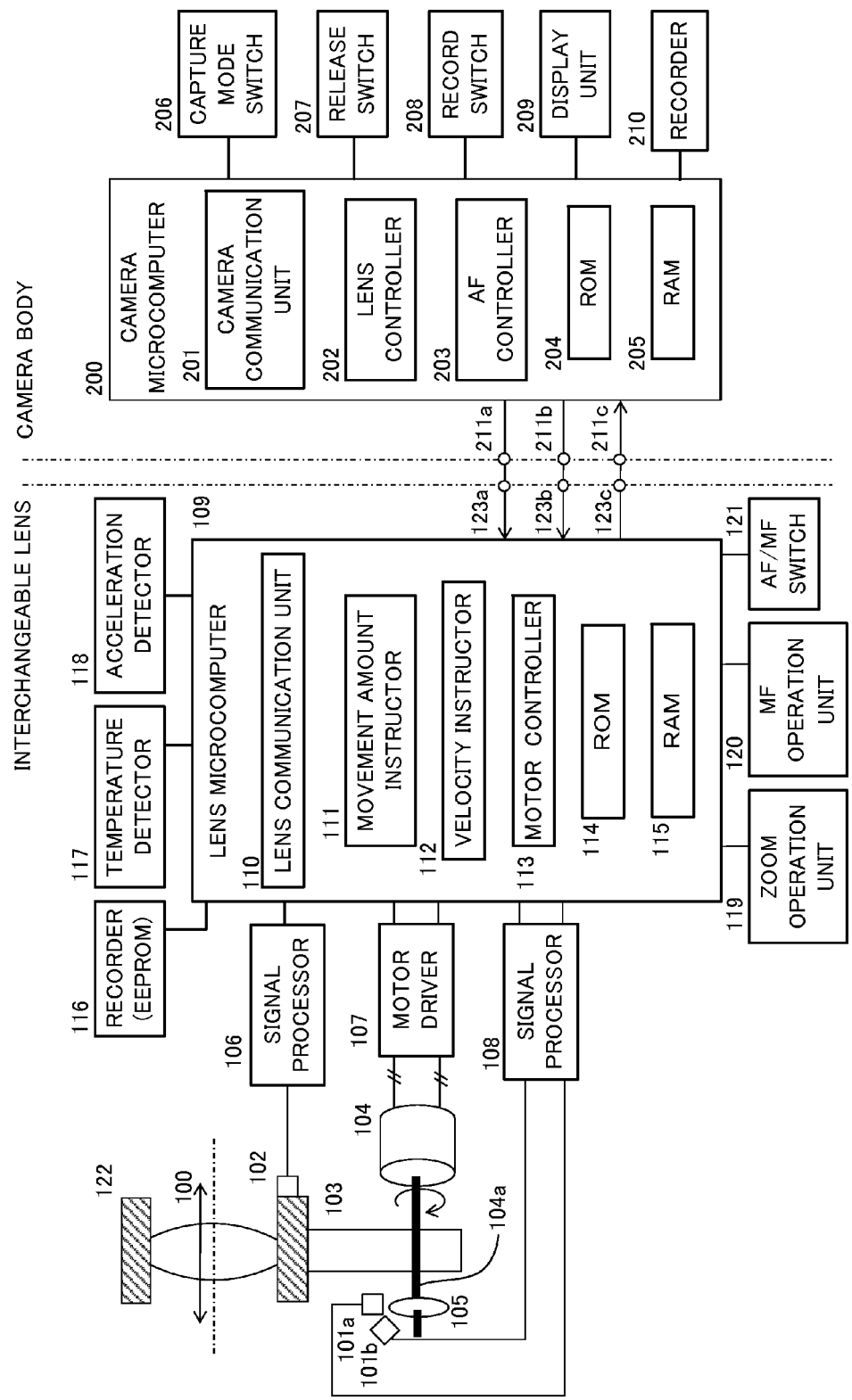
FIG. 1 is a block diagram of a camera system according to first, second, and third embodiments of the present invention.

FIG. 1 is a block diagram of the camera system (an optical apparatus) according to this embodiment. The camera system includes an interchangeable lens (a lens unit or an optical apparatus) and a camera body to which the interchangeable lens is attached. The camera body is a lens-interchangeable image pickup apparatus and may be a single reflex camera or a mirror-less camera. The optical apparatuses according to the present invention may be configured as a lens-integrated image pickup apparatus such as a digital camera.

The interchangeable lens includes an image pickup optical system configured to form an optical image of an object. The image pickup optical system is a magnification varying optical system having a magnification-varying function that varies a focal length. The camera body includes an image sensor, such as a CCD sensor or a CMOS sensor, configured to photoelectrically convert the optical image of the object formed by the image pickup optical system. The camera system is configured to capture a still image and a motion image.

The image pickup optical system includes a focus lens 100. The focus lens 100 includes one or more lens units, but is illustrated as a single lens in FIG. 1 for graphical convenience and is moved for focusing in an optical-axis direction of the image pickup optical system indicated by an alternate long and short dash line. The focus lens 100 is held by a lens holder 122 which is movable by a cam ring mechanism, etc.

Reference numeral 109 denotes a lens microcomputer (lens controller) configured to control driving of a stepping motor 104 and to perform various processing in response to signals from various detectors. Reference numeral 103 denotes a driving unit, such as a gear and a lead screw, and reference numeral 104 denotes a stepping motor (hereinafter simply referred to as "motor"). The rotation of a rotational shaft 104a of the motor 104 integrally drives the lens holder 122 and the focus lens 100 via the driving unit 103.

A motor controller 113 in the lens microcomputer 109 generates a control signal for driving the motor 104. In other words, the lens microcomputer 109 functions as a control unit configured to control the stepping motor 104; however, a camera microcomputer 200 described later may have this function. A method of controlling the stepping motor 104 also constitutes one aspect of this embodiment.

The motor controller 113 generates an excitation pattern for each phase of the motor 104 according to a 2-phase drive, 1-2-phase drive, micro step driving, or another driving method. A motor driver 107 converts a generated control signal into a necessary current and a necessary voltage, and then supplies them to the motor 104. The motor 104 counts the number of changes in the generated excitation pattern and generates a rotation amount (corresponding to a "movement amount" of a focus lens unit).

There is provided an encoder configured to detect a rotational position of the stepping motor 104. The encoder includes photo-interrupters 101a and 101b, and a pulse plate 105.

The pulse plate 105 is provided in front of the rotational shaft 104a of the motor 104. Light-transmitting slits and light shields each having a predetermined width alternate in a circumferential direction of the pulse plate 105. When the light shields of the pulse plate 105 is located in the optical paths of the photo-interrupters 101a and 101b, outputs of the photo-interrupters 101a and 101b change, thereby a rotational angle of the motor 104 can be detected. Using the plurality of photo-interrupters 101a and 101b improves the detection accuracy of the rotational angle and enables a rotational direction to be identified. This embodiment detects the rotational direction of the motor 104 by using a pair of photo-interrupters 101a and 101b and by shifting output phases, but may use a Hall element and a magnet or a mechanical switch for similar detections. Reference numeral 108 denotes a signal processor configured to amplify outputs of the two photo-interrupters 101a and 101b and to convert the outputs into detectable levels by the lens microcomputer 109.

Reference numeral 102 denotes a photo-interrupter configured to detect a reference position of the focus lens 100. An output of the photo-interrupter 102 is input to a signal processor 106 and converted into a detectable level by the lens microcomputer 109 (such as high/low levels). Using a movement amount corresponding to the output change of the photo-interrupter 102 from the high level to the low level or from the low level to the high level for a reference position enables a position of the focus lens 100 to be treated as an absolute position. The operation of detecting the reference position will be hereinafter referred to as a "reset operation."

Reference numerals 123a, 123b, and 123c denote contacts of communication lines at the lens unit side, i.e., a contact on a clock signal line, a contact on a data line from the camera body to the lens unit, and a contact on a data line from the lens unit to the camera body. This embodiment describes an example of three-wire serial communication, but may use a communication method such as a start-stop synchronous communication and a LVDS (low-voltage differential signal) communication.

Reference numeral 116 denotes a data rewritable recorder, such as an EEPROM, configured to record a period used and the number of uses of the interchangeable lens, a driving time period of the motor 104, and the like. Reference numeral 117 denotes a temperature detector configured to detect a temperature of the interchangeable lens. Reference numeral 118 denotes an acceleration detector configured to detect an acceleration applied to the interchangeable lens. The acceleration detector 118 can also detect the gravity direction, and thereby an orientation of the image pickup apparatus can be detected, such as facing upward or downward.

The interchangeable lens includes a zoom operation unit 119. The zoom operation unit 119 varies a magnification. In the inner focus type that fixes a front lens, the focus lens 100 need to move and correct a focus fluctuation caused by the magnification-varying operation. This control is referred to as a "tracking control." A relationship between the focus lens 100 and a zoom lens (not illustrated) is expressed by tracking curves. The focus lens 100 is driven along the tracking curve in zooming.

The interchangeable lens further includes a manual focusing (MF) operation unit 120 and an autofocusing (AF)/MF switch 121. The MF operation unit 120 is configured as, for example, a focus ring and used for manual focusing by a user. The AF/MF switch 121 is set to "AF" in the AF and to "MF" in the MF.

In the lens microcomputer 109, reference numeral 110 denotes a lens communication unit used to communicate with the camera body. In this embodiment, the lens communication unit 110 receives a driving instruction, camera identification ("ID") information, a status, a capture condition, and the like from the camera body, and sends various information such as lens ID information a focus lens position, a diaphragm position, and a zoom position.

Reference numeral 111 denotes a movement amount instructor configured to instruct a movement amount of the focus lens 100 or a rotation amount of the motor 104 in driving the motor 104. The movement amount may be expressed by an absolute position of the focus lens 100 because the movement amount associates with the reset operation. Reference numeral 112 denotes a velocity instructor configured to instruct a target velocity (a rotational speed) in driving the motor 104.

In addition to the open-loop control, the motor controller 113 can feedback-control driving of the motor 104 by generating an application timing of a driving waveform to the motor 104 by using rotational information of the motor 104 obtained in the signal processor 108. Reference numeral 114 denotes a ROM area configured to store the above functions and another control program. Reference numeral 115 denotes a RAM area configured to temporarily store calculation results and necessary data for the above functions and the other control program.

In the camera body, reference numeral 200 denotes a camera microcomputer (camera controller) configured to provide various controls to capturing, displaying, and image recording in the recorder. Reference numeral 201 denotes a camera communication unit used to communicate with the lens unit. The camera communication unit 201 sends a driving instruction and various information from the camera body to the lens unit, and receives a lens status. The camera communication unit 201 communicates with the lens unit via contacts 211a, 211b, and 211c.

The contacts 211a, 211b, and 211c are a contact on a clock signal line, a contact on a data line from the camera body to the interchangeable lens, and a contact on a data line from the interchangeable lens to the camera body, which are provided on the camera body side.

Reference numeral 202 denotes a lens controller configured to generate an instruction to the interchangeable lens so as to require the lens unit for an operation as desired by the camera body. For instance, the lens control unit 202 calculates the movement amount to an in-focus position in the AF. The lens control unit 202 provides the movement amount to the lens unit in the driving instruction via the camera communication unit 201, and thereby the lens unit performs desired focusing and obtains an in-focus position.

The lens control unit 202 includes a moving-object detector configured to detect a moving object based on an output of an image sensor when the object is moving. In detecting the moving object, the moving-object detector can use a method that calculates a difference between adjacent frames for each pixel in a target area and recognizes the moving object when the sum of differences between corresponding pixels is equal to or higher than a predetermined threshold or a background difference method that calculates an area of the moving object based on a difference between a reference image and a current image. The moving-object detector sends a detection result to the lens microcomputer 109. When the moving-object detector detects the moving object, it is necessary to predict and follow a movement of the object. In other words, it is necessary to predict driving of the focus lens 100 when the moving-object detector detects the moving object, and it is unnecessary to predict driving of the focus lens 100 when the moving-object detector does not detect the moving object.

Reference numeral 203 denotes an AF controller for AF. The AF controller 203 provides AF by a phase difference method (phase difference AF) that determines an in-focus position using a phase difference detector, and AF by a contrast method (contrast AF) that obtains an in-focus position by driving the focus lens 100 which corresponds to a peak of a contrast value obtained from the image sensor. When the camera body is a single reflex camera, the phase difference detector may be a unit for receiving a light beam deflected by a sub-mirror. When the camera body is a mirror-less camera, the phase difference detector is provided as a focus detection pixel for receiving axial light on an image pickup plane of the image sensor separately from an image pickup pixel.

Reference numerals 204 and 205 denote a ROM area configured to store control programs and a RAM area configured to temporarily store calculation results and necessary data, respectively, which are similar to those of the lens unit.

The communication lines and power lines of the camera body and the lens unit are connected via a mount. The camera communication unit 201 and the lens communication unit 110 communicate with each other, for example, every event or in a fixed cycle. The fixed cycle may depend, for instance, on a cycle of a vertical synchronizing signal used by the camera body to display an image.

Reference numeral 206 denotes a capture mode switch. The "capture mode" includes a still image capture mode for a still image and a motion image capture mode for a motion image, and serves as an AF type setting switch. In other words, the AF controller 203 selects the phase difference AF in the still image capture mode, and the contrast AF in the motion image capture mode.

Reference numeral 207 denotes a release switch used in still image capturing. Reference numeral 208 denotes a record switch used in motion image capturing. Reference numeral 209 denotes a display unit, such as an LCD or an OLED display unit, configured to display an object image being captured or to be captured and various information. A recorder 210 records a captured still image and a captured motion image.

Figure 2:
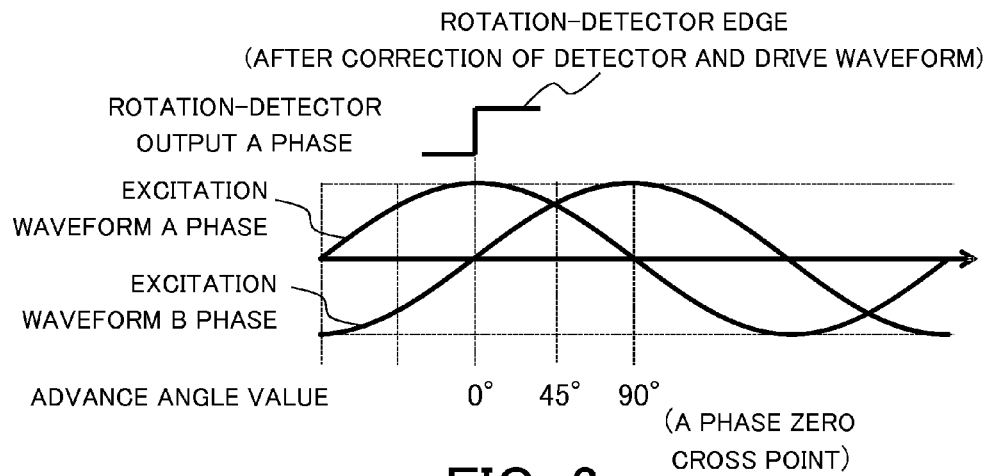
FIG. 2 is an explanatory diagram of a basic concept of an advance angle control according to the first, second, and third embodiments.

FIG. 2 illustrates micro step driving which applies an excitation waveform that is an approximate sine wave. In open-loop-controlling the stepping motor, an excitation voltage corresponds to a velocity with a sufficient torque margin and the motor driver drives the stepping motor. The feedback control applies an excitation voltage so that a zero cross point of the A phase becomes closer to an encoder edge based on a high-low switching edge of the encoder, or in an accelerating direction.

This operation will be hereinafter referred to as "advancing an advance angle." Repeatedly advancing an advance angle for each detector edge up to the target velocity provides a gradual acceleration. In contrast, in the deceleration, an advance angle is repeatedly delayed for each encoder edge down to the target or desired velocity. In addition, an advance angle is repeatedly advanced or delayed in the constant-velocity drive so that the velocity can converge nearly to the desired velocity. This feedback control will be hereinafter referred to as an "advance angle control."

For simplicity purposes, FIG. 2 accords the detector edge with one phase excitation output of the A phase. While a detector attachment phase is actually adjusted to a motor excitation phase, a description thereof will be omitted since this is a well-known technology.

Figure 3:
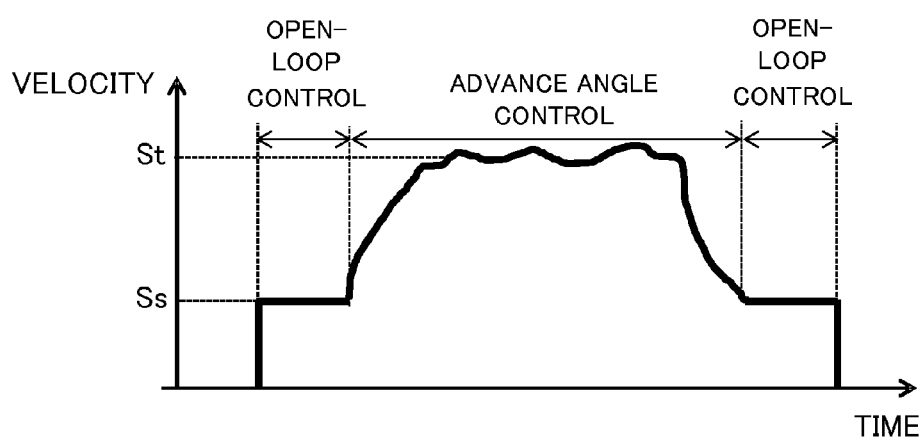
FIG. 3 is a diagram of an illustrative velocity variation under the advance angle control according to the first, second, and third embodiments.
Figure 4:
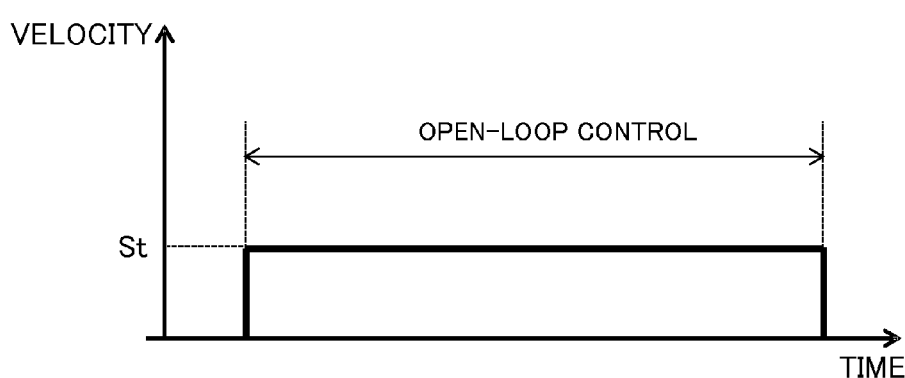
FIG. 4 illustrates an illustrative velocity variation under an open-loop control according to the first, second, and third embodiments.

FIG. 3 illustrates a velocity variation characteristic in the advance angle control. The motor is initially driven under the open-loop control. The motor is driven at a velocity Ss under the open-loop control until an encoder output becomes stable, and the control is switched to the advance angle control after the output becomes stable. When the encoder has a sufficiently high detection resolution and the motor sufficiently follow the velocity, the open-loop control period may be omitted. After the open-loop control is switched to the advance angle control, the motor is gradually accelerated up to the target velocity St. The motor is decelerated under the advance angle control before the target movement amount (rotational angle) is reached, the control is turned to the open-loop control, and the driving is stopped with the target movement amount. While this embodiment adopts a control method that switches the advance angle control and the open-loop control, driving only under the advance angle control may be used. FIG. 4 illustrates a velocity characteristic in the open-loop control for all driving areas for driving with the target movement amount.

This embodiment open-loop-controls the stepping motor 104 and changes a control signal without a feedback of a signal generated by the encoder in at least one or both of a drive start period and a drive stop period of the motor 104. This is because the encoder output is detected at the drive starting time, the motor controller 113 waits until the rotation of the motor 104 becomes stable in order to prevent the motor from stepping out. In the drive stop period, the stepping motor 104 is open-loop-controlled due to a high stopping resolution.

This embodiment determines one of the open-loop control and the advance angle control to drive the motor 104, based on a capture mode of the image pickup apparatus. This operation will be described below in detail.

First Embodiment

Figure 5:
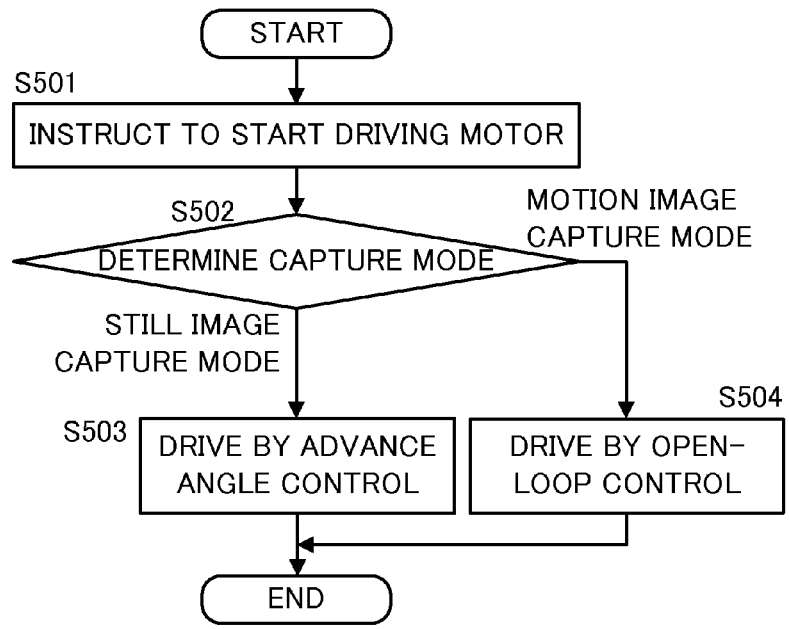
FIG. 5 is a flowchart of a motor control according to the first embodiment of the present invention.

FIG. 5 is a flowchart of an operation of (a method of controlling) the lens microcomputer 109 according to the first embodiment. A symbol "S" stands for the "step." The flowchart illustrated in FIG. 5 can be implemented as a program that enables a computer to execute a function of each step and this is also applicable to other flowcharts. The camera microcomputer 200 may execute the operation illustrated in FIG. 5 instead of the lens microcomputer 109.

In S501, the lens microcomputer 109 instructs the motor driver 107 to start driving the motor 104. This instruction determines a movement amount and a velocity of the motor 104. In a focusing mechanism, user's MF operation or AF drive corresponds to this drive start instruction. In S502, the lens microcomputer 109 determines a capture mode. This embodiment considers two types of capture modes, i.e., the still image capture mode and the motion image capture mode.

In the still image capture mode, the flow proceeds to S503 that drives the motor under the advance angle control or under a combination of the advance angle control and the open-loop control. This is because the focus lens 100 needs to quickly move by the target movement amount in the still image capturing and the lens microcomputer 109 needs to drive the focus lens 100 at a high velocity.

In the motion image capture mode, the flow proceeds to S504 that drives the motor under the open-loop control. The lens microcomputer 109 drives the focus lens 100 at a low velocity because the motion image capturing needs to be silent. An AF method used in the motion image capturing is the contrast method that repeatedly drives, stops, and reverses the focus lens 100, and driving of the motor under the open-loop control is suitable.

Figure 6:
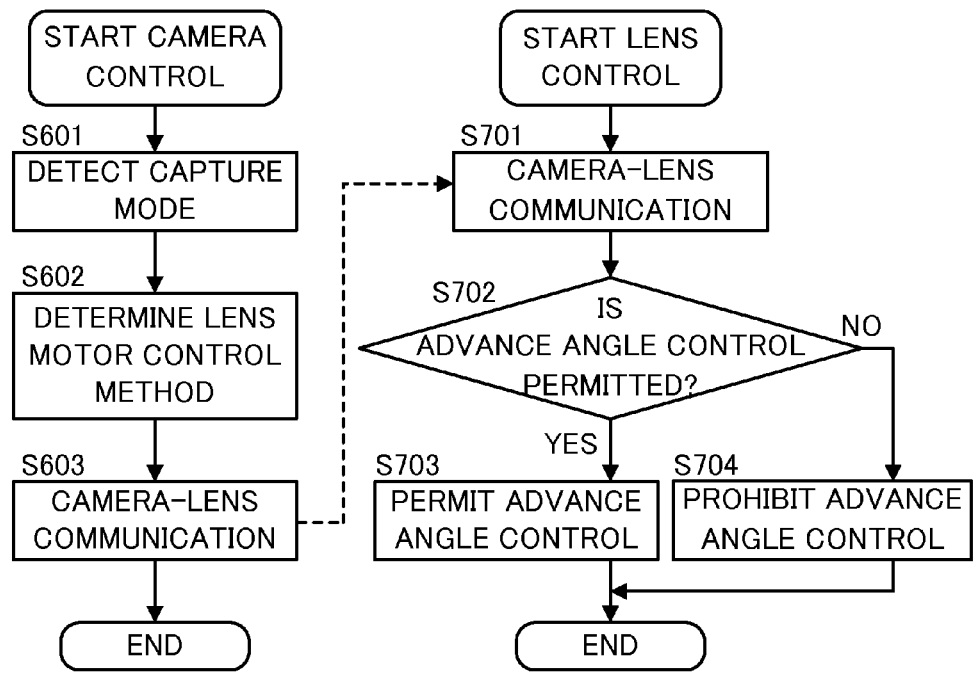
FIG. 6 is a flowchart of the motor control according to the first embodiment of the present invention.

FIG. 6 illustrates control operations of the camera body and the lens unit when the control according to this embodiment is applied to the interchangeable lens type image pickup apparatus. In FIG. 6, the camera microcomputer 200 determines whether or not the advance angle control is required.

The camera microcomputer 200 detects a capture mode in S601, and selects one of the advance angle control, the combination of the advance angle control and the open-loop control, and the open-loop control in driving the motor 104 in S602. Similarly to the operation illustrated in FIG. 5, the camera microcomputer 200 selects the advance angle control for the still image capturing and the open-loop control for the motion image capturing. In S603, the camera microcomputer 200 notifies the lens unit of the control method determined in S602 via the communication between the camera communication unit 201 and the lens communication unit 110. In this example, the information contains a permission or non-permission of the advance angle control.

The lens microcomputer 109 receives, in S701, the permission information of the advance angle control sent in S603 and determines, in S702, whether or not the advance angle control is permitted. The lens microcomputer 109 sets a control method to the advance angle control in S703 when the advance angle control is permitted and to the open-loop control in S704 when the advance angle control is not permitted.

Table 1 summarizes motor controlling methods according to the combination of capture modes of the camera body and operating modes of the interchangeable lens.

TABLE 1

| CAMERA | LENS | AF | MF | ZOOMING |
|---|---|---|---|
| STILL IMAGE CAPTURE MODE | ADVANCE ANGLE/ OPEN LOOP | OPEN LOOP | OPEN LOOP |
| LIVE-VIEW MODE | OPEN LOOP | OPEN LOOP | OPEN LOOP |
| MOTION IMAGE CAPTURE MODE | OPEN LOOP | OPEN LOOP | OPEN LOOP |

The capture modes are classified into the three types, i.e., the still image capture mode, a live-view mode, and the motion image capture mode. "OPEN LOOP" and "ADVANCE ANGLE" denote the open-loop control and the advance angle control, respectively. The "LIVE-VIEW MODE (live-viewing)" means a preview state in which the recorder 210 does not record a motion image or a still image and the display unit 209 sequentially displays an object image for an angle-of-view adjustment and a preparation for image pickup.

The lens operating modes related to focus driving are classified into the AF, the MF, and tracking control (indicated in the table as "ZOOMING") which is used to correct a focus fluctuation caused by zooming.

Since the AF in the still image capturing requires high-speed focusing, the focus lens 100 is driven at a high velocity under the advance angle control but the open-loop control is used for at least one of the drive start period and the drive stop period of the stepping motor. In this case, the drive start period covers a predetermined time period from the start of the drive of the motor 104. This predetermined time period may be set to a predefined time period in advance or to a time period necessary to reach a predetermined velocity. In other words, the feedback control is used when the target velocity instructed by the velocity indicator 112 is higher than a threshold, and the open-loop control is used when the target velocity is equal to or lower than the threshold. The MF requires high responsiveness to the operation. The following performance is secured with the open-loop control because the advance angle control requires an acceleration time period. The focus driving in the tracking control also requires a following performance and a stop accuracy. Thus, this case also needs the open-loop control.

Figure 7:
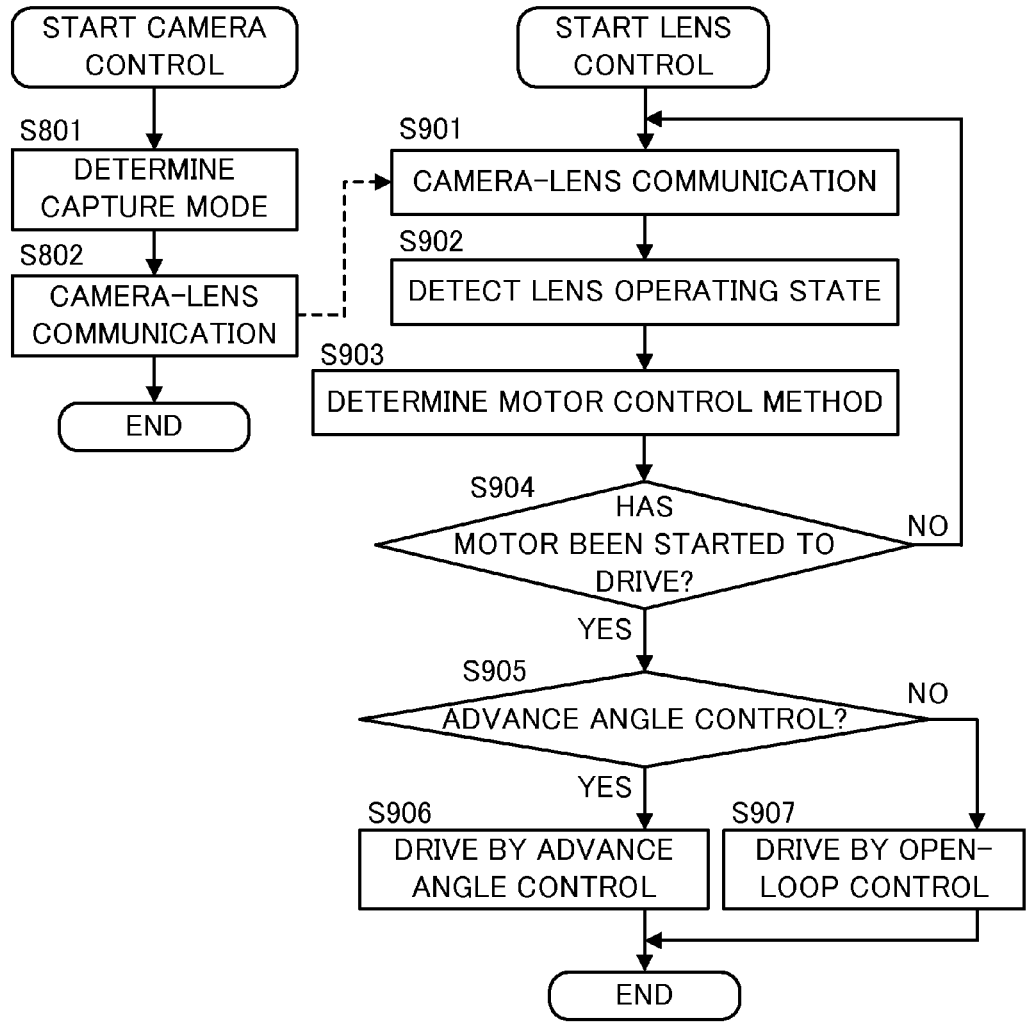
FIG. 7 is a flowchart of a motor control that depends upon a capture mode and a lens operating mode according to the first embodiment of the present invention.

FIG. 7 is a flowchart of the operation illustrated in Table 1. In this flowchart, the lens microcomputer 109 determines whether or not to perform the advance angle control. The camera microcomputer 200 determines the capture mode in S801, using states of the capture mode switch 206 and the record switch 208. The camera microcomputer 200 determines one of the still image capture mode, the live-view mode, or the motion image capture mode based on the detected states. The camera microcomputer 200 sends a determination result (mode) to the lens unit in S802. The communication between the camera communication unit 201 and the lens communication unit 110 in S802 contains not only the determination result, but also various camera states and driving instructions of the focus lens 100 and the diaphragm.

The lens microcomputer 109 receives various information such as states of the focus lens, the diaphragm and the camera body, and information on the capture mode from the camera microcomputer 200 in S901 and detects a lens operating state in S902. The lens operating state can be detected based on states of the zoom operation unit 119 and the AF/MF switch 121. The lens microcomputer 109 determines whether or not the advance angle control is available, based on the received information on the capture mode of the camera body and the operating state of the lens unit in S903.

The lens microcomputer 109 determines, in S904, whether or not starting driving the motor 104 is necessary. An instruction to start driving the motor 104 is the driving instruction from the camera body and the MF operation unit 120 received in S901. The flow proceeds to the next step when starting driving the motor 104 is necessary and returns to S901 when starting driving the motor 104 is unnecessary.

The lens microcomputer 109 determines whether or not the motor control method determined in S903 is the advance angle control in S905 and then drives the motor 104 under the advance angle control (S906) or the open-loop control (S907).

Next follows an exception on the switching between the advance angle control and the open-loop control illustrated in Table 1 and FIG. 7. In order to avoid stepping out, the advance angle control is more suitable in reversing the driving direction under the open-loop control or in driving the motor under an environment which exceeds the performance limit of the image pickup apparatus, even when the open-loop control is being selected. In such cases, driving only under the advance angle control is more suitable than driving under the combination of the open-loop control and the advance angle control illustrated in FIG. 3.

One illustrative condition for applying this exception is reverse driving when the motor 104 is being driven. If the open-loop control continues when the motor 104 is reversely driven, the motor 104 is likely to step out. Accordingly, when the motor 104 is reversely driven, the advance angle control is exceptionally used for the driving. Another expected condition is a load increase under a low temperature environment. Since the image pickup apparatus operates under an environment beyond the performance limit, when a temperature detected by the temperature detector 117 is equal to or lower than a predetermined temperature, the advance angle control exceptionally is used instead of the open-loop control. This method can avoid the inoperativeness of the image pickup apparatus.

Second Embodiment

Figure 8:
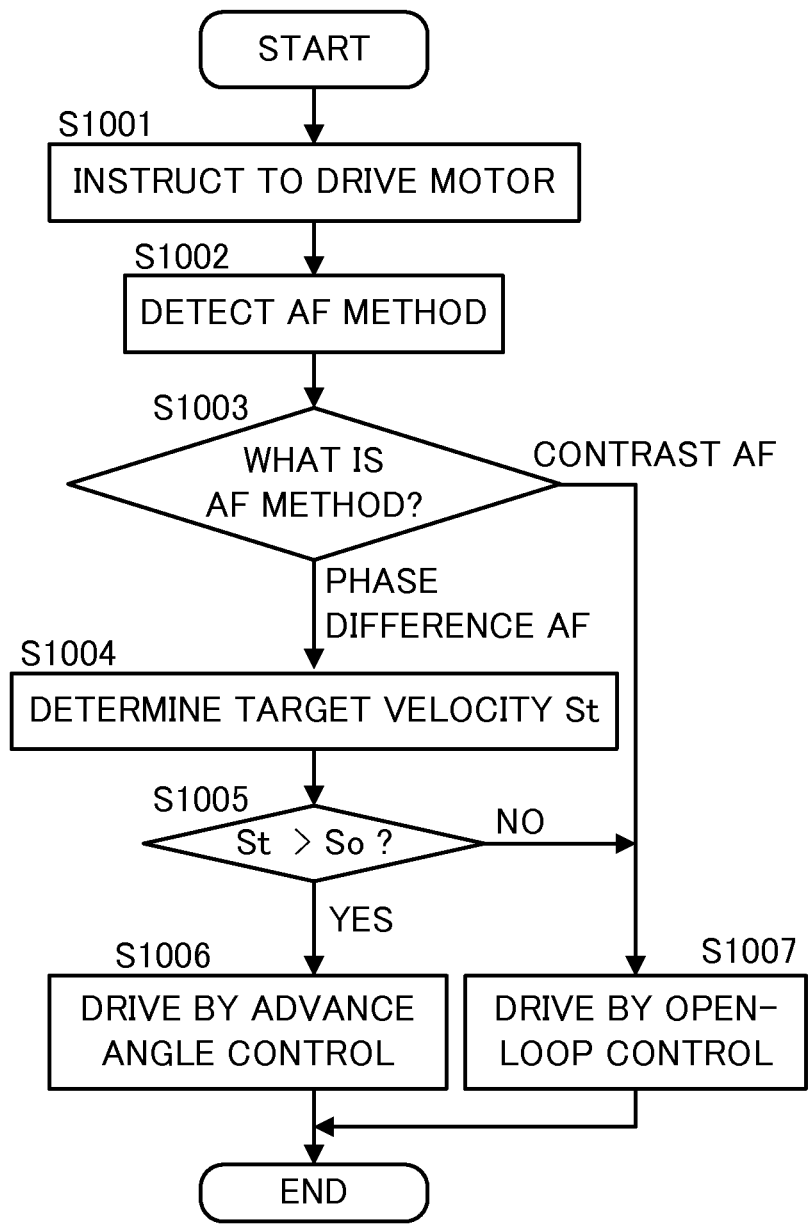
FIG. 8 is a flowchart of a motor control according to the second embodiment of the present invention.

In the second embodiment, the lens microcomputer 109 determines one of the open-loop control and the advance angle control based on the AF method of the image pickup apparatus. FIG. 8 is a flowchart of a motor control suitable for the AF method of the image pickup apparatus performed by the lens microcomputer 109.

First, the lens microcomputer 109 obtains a motor driving instruction in S1001. The lens microcomputer 109 receives the drive instruction from the camera body via communication for the interchangeable lens. Next, the lens microcomputer 109 detects an AF method in S1002. Similarly to the motor drive instruction, the lens microcomputer 109 receives the AF method from the camera body via the communication in the interchangeable lens system. The lens microcomputer 109 recognizes whether the AF method used for capturing is the phase difference AF or the contrast AF in S1003.

The phase difference AF detects a focus state by detecting a phase difference between image signals of a pair of object images. The contrast AF detects a focus state by detecting a contrast peak position of an object image formed by the image sensor through scanning that varies a distance (relative positions) between a focus position formed by the image pickup optical system and the image sensor.

The lens microcomputer 109 determines a target velocity St in S1004 in the phase difference AF, and determines whether or not St is higher than a velocity threshold So in S1005. The lens microcomputer 109 drives the motor 104 under the advance angle control in S1006 when St is higher. The lens microcomputer 109 drives the motor 104 under the open-loop control in S1007 when the AF method is the contrast AF or St is equal to or lower than So in S1003.

The phase difference AF provides a movement amount of the focus lens 100 from its current position to an in-focus position before the focus lens is moved, and realizes high-speed AF. The contrast AF detects a contrast peak position while moving the focus lens 100, and the focus lens 100 may be driven in a direction opposite to the in-focus direction or may go past the in-focus position. In such a case, reversing is necessary, and driving by the advance angle control takes a longtime for the deceleration. Accordingly, the open-loop control is applied to the focusing by the contrast AF to shorten a time period from a driving stop (deceleration) to reverse driving and to expedite focusing.

The contrast AF mainly uses two driving types. One is wobbling drive that continuously reciprocates the motor by a micro amount in order to determine a direction of the in-focus position (or an in-focus direction) and to find the in-focus position near the in-focus position. The other is mountain-climbing drive that drives the motor by a relatively large amount in the in-focus direction after the in-focus direction is determined.

Figure 9:
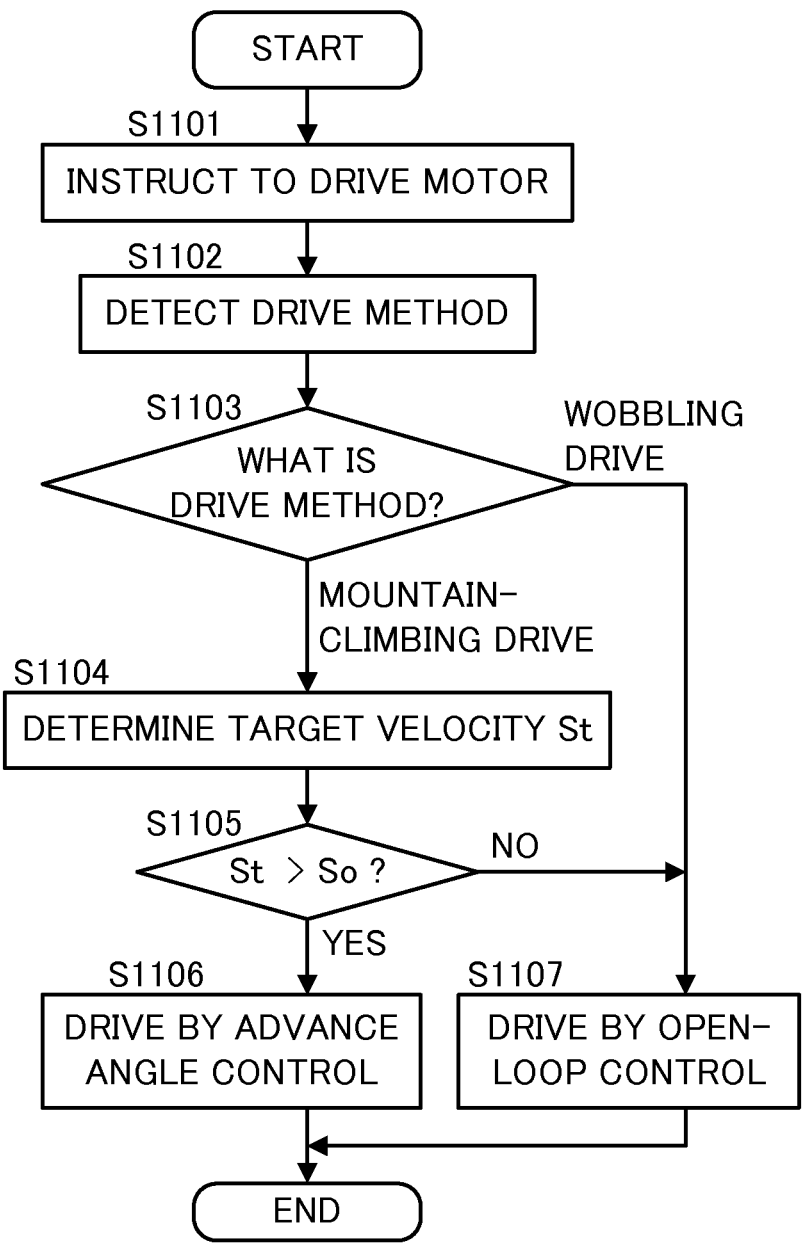
FIG. 9 is a flowchart of the motor control according to the second embodiment of the present invention.

FIG. 9 is a flowchart of high-speed driving under the advance angle control in the mountain-climbing drive. First, the lens microcomputer 109 obtains a drive instruction for the motor 104 in S1101. Similarly to FIG. 8, the lens microcomputer 109 receives the drive instruction from the camera body via the communication for the interchangeable lens. Next, the lens microcomputer 109 detects whether a drive method used for the contrast AF is the wobbling drive or the mountain-climbing drive in S1102. The driving information can be received from the camera body via the communication in the interchangeable lens system. The lens microcomputer 109 proceeds to S1104 for the mountain-climbing drive in S1103 and proceeds to S1107 for the wobbling drive.

The lens microcomputer 109 determines a target velocity St in S1104. The camera body sends an instruction on the target velocity to the lens microcomputer 109 in the interchangeable lens system. The lens microcomputer 109 determines whether or not St is higher than the velocity threshold So in S1105. The advance angle control is selected in S1106 when St is higher, and the open-loop control is selected in S1107 when St is equal to or lower than So.

Since the wobbling drive is micro reciprocating, a driving time period can become shorter at a velocity of the pull-in torque than with the acceleration/deceleration under the advance angle control. On the other hand, the phase difference AF and mountain-climbing driving need a large driving amount with a relatively high velocity, as described above, the advance angle control is advantageous. As described above, the appropriate selection of the advance angle control and the open-loop control in driving the motor 104 realizes quicker and more accurate focusing.

Third Embodiment

According to the third embodiment, in driving the focus lens 100, the lens microcomputer 109 selects one of the open-loop control and the advance angle control to drive the motor 104 on the basis of the prediction necessity of a drive position, a drive velocity, and the like. As described above, the prediction is required when the object is moving and is not required when the object is not moving.

Figure 10:
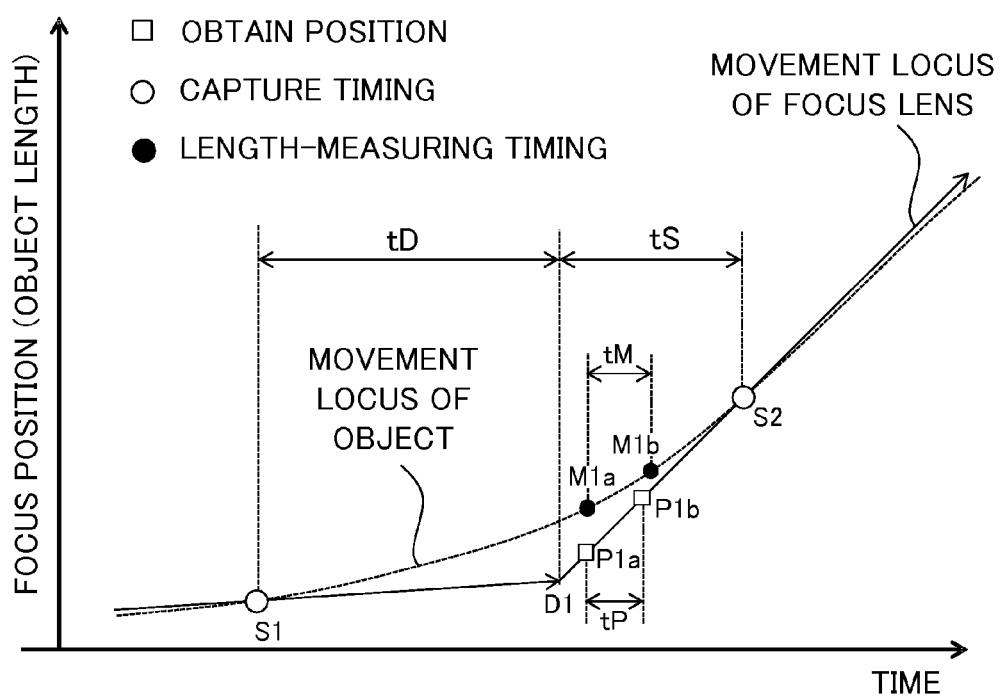
FIG. 10 illustrates a relationship between a trajectory of a moving object and that of a focus lens.

In capturing a moving object while the object is being autofocused, the in-focused object can be captured by according a trajectory of the focus lens 100 with that of the object. This is because of a shift between the focus detection timing by the phase difference AF and the capturing timing of the object after the focus lens 100 is driven. FIG. 10 illustrates an illustrative phase difference AF on the moving object. A solid line represents a trajectory of the focus lens 100, a dotted line represents that of the object. S1 and S2, intersections of the solid line and the dotted line, represent capturing timings. A description will now be given of a focus position estimating method at S2. D1 represents a moving direction changing position of the focus lens 100. In driving the focus lens 100 from D1 to S2, the lens microcomputer 109 obtains focus positions at P1a and P1b, and tP represents a time difference between them. M1a and M1b represent object lengths converted into focus positions, and tM represents a time difference between them. A movement amount per unit time of the focus lens 100 (or a slope) is expressed as follows:

$$\alpha P=(P1b-P2b)/tP \quad (1)$$

A movement amount per unit time of the object (or a slope) is expressed as follows:

$$\alpha M=(M1b-M2b)/tM \quad (2)$$

The focus position S2 at a next capturing timing, and time tS can be expressed as follows by using the above slopes and a time tD from the focus position S1 at the previous capturing timing to the position D1.

$$tS=(\alpha M \times tD+S1-D1)/(\alpha P-\alpha M) \quad (3)$$

$$S2=\alpha P \times (\alpha M \times tD+S1-D1)/(\alpha P-\alpha M)+D1 \quad (4)$$

The trajectory of the focus lens 100 may be linear in a prediction calculation of the capturing timings described above. However, a positional prediction in the acceleration is difficult in the advance angle control.

Figure 11:
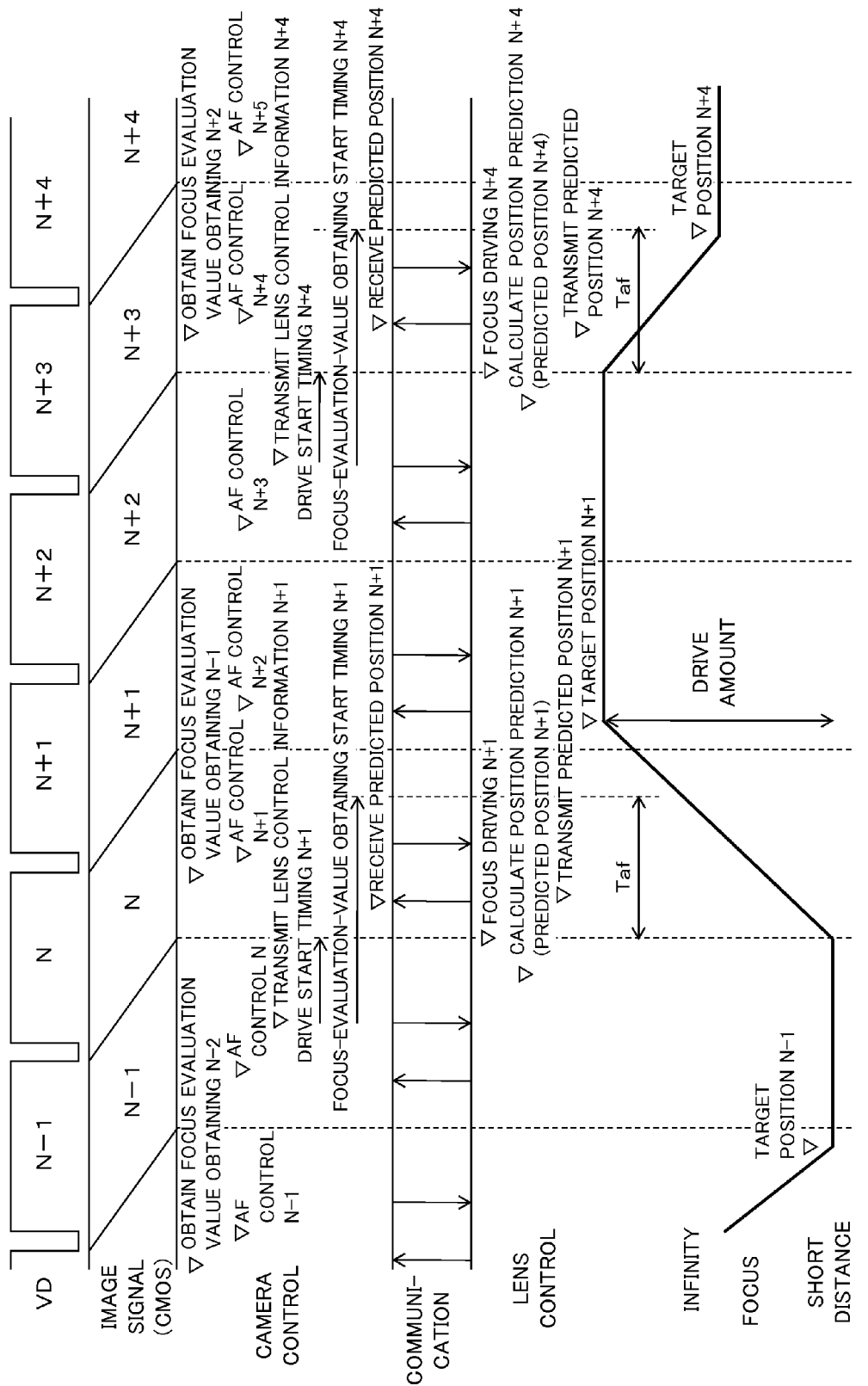
FIG. 11 is a diagram illustrating a control and a communication timing of a contrast AF in an interchangeable lens type image pickup apparatus.

Referring now to FIG. 11, a description will be given of an illustrative positional prediction in the contrast AF in the interchangeable lens type image pickup apparatus. In the contrast AF, it is necessary to set a correlation between the timing to obtain a focus evaluation value signal (contrast information) and a position of the focus lens 100. However, in the interchangeable lens system, it is difficult to send from the image pickup apparatus to the interchangeable lens a drive starting instruction of the focus lens 100 and to obtain a position of the focus lens 100 on a real-time basis with various processing such as image processing and a diaphragm control. One known method is to set a correlation between the obtaining timing of the focus evaluation value signal and the position of the focus lens 100 by predicting the position of the focus lens 100.

VD represents a vertical synchronizing signal. An image signal from the image sensor (such as a CMOS sensor) is read out by using VD as a trigger. The camera microcomputer 200 sends a drive start timing N+1 of the focus lens 100 as timing information, and a focus evaluation value obtaining timing N+1 as an obtaining start timing of the focus evaluation value signal to the lens microcomputer 109 in a lens control information transmission N+1. The camera microcomputer 200 also sends a target position N+1 as information on a target focus position (an obtaining target position) to the lens microcomputer 109.

The lens microcomputer 109 receives and temporality stores the lens control information, and clears a timer and sets a timer interrupt so as to start driving the focus lens 100 at the drive start timing.

Next, the lens microcomputer 109 performs a position prediction calculation N+1. Assume that the predicted focus position obtained in this calculation is a predicted position N+1. In the position prediction calculation, the lens microcomputer 109 determines whether or not the focus lens 100 has reached the target position N+1 instructed by the camera microcomputer 200 by the focus evaluation value obtaining timing N+1, and predicts a position of the focus lens 100 at the focus evaluation value obtaining timing N+1. Upon completion of the position prediction calculation, the lens microcomputer 109 waits for the set timer interrupt, and starts driving the focus lens 100 upon the timer interrupt.

The lens microcomputer 109 sends a result of the position prediction calculation to the camera microcomputer 200 at a predicted position transmission timing N+1. The camera microcomputer 200 receives the result of the position prediction calculation by the lens microcomputer 109 and determines whether a current focus drive state is a next driving mode of the focus lens or a stop mode of obtaining a focus evaluation value. The camera microcomputer 200 determines a next target focus position (a target position) based on the received, predicted focus position, and a next drive start timing of the focus lens 100 as well.

When the predicted position N+1 does not accord with the target position N+1 and the focus position does not reach the target focus position by the focus evaluation value obtaining timing N+1, the camera microcomputer 200 does not obtain a focus evaluation value signal N+1 from an image pickup signal N+1 as illustrated in FIG. 11. Instead, the camera microcomputer 200 obtains and stores a focus evaluation value signal N+2 from a next image signal N+2. Using the stored focus evaluation value signal and the focus position, the camera microcomputer 200 recognizes a relationship among the past focus evaluation value signals, and drives the focus lens 100 to an in-focus position.

Figure 12:
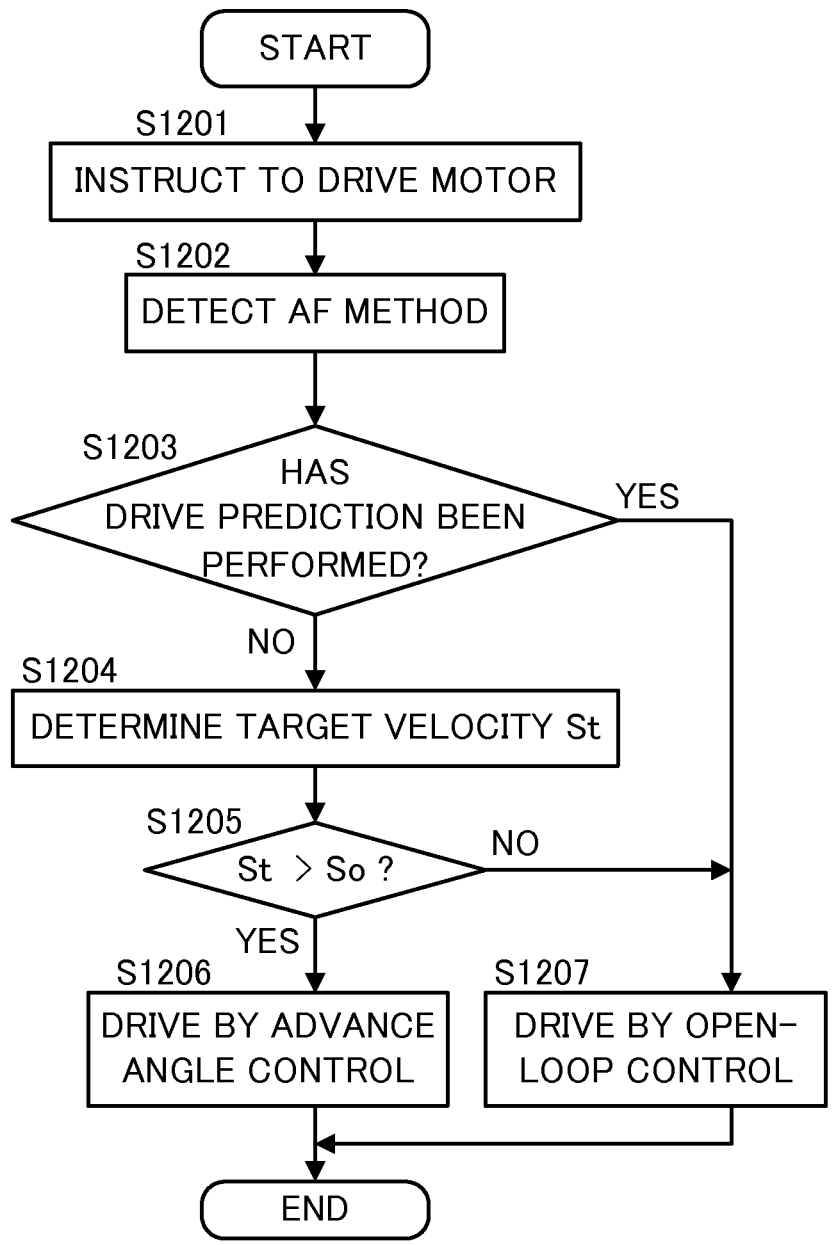
FIG. 12 is a flowchart of a motor control according to the third embodiment of the present invention.

Even in this case, similarly to the AF on the moving object described above, it is difficult to predict a position in the acceleration or deceleration in the advance angle control. FIG. 12 is a flowchart of a solution for this problem in the position prediction. First, in S1201, the lens microcomputer 109 obtains a motor drive instruction. In the interchangeable lens system, the lens microcomputer 109 obtains the drive instruction from the camera body via the communication. Next, in S1202, the lens microcomputer 109 detects an AF method. Similarly to the motor drive instruction, in the interchangeable lens system, the lens microcomputer 109 receives the AF method from the camera body via the communication. Then, in S1203, the lens microcomputer 109 determines whether or not it is necessary to predict a movement of the focus lens 100. The flow proceeds to S1207 to drive the motor 104 by the open-loop control when the prediction is necessary. The flow proceeds to S1204 to set a target velocity St when the prediction is unnecessary. Then, in S1205, it is determined whether or not St is higher than the velocity threshold So for the open-loop control and the advance angle control. The advance angle control is set in S1206 when St is higher and the open-loop control is set in S1207 when St is equal to or lower than So.

As described above, the open-loop control is used instead of the advance angle control when it is necessary to predict the position of the focus lens 100 so as to simplify the prediction calculation and to improve the prediction accuracy.

The above embodiments can provide a stepping motor control unit, a stepping motor control method, and an optical apparatus, which can properly control a stepping motor according to a pair of a capture mode and a lens operating mode.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-149988, filed on Jul. 19, 2013, which is hereby incorporated by reference herein in its entirety.

What is claimed is:

1. A control unit for a stepping motor configured to drive a focus lens, the control unit comprising:
an encoder configured to detect a rotational position of the stepping motor; and
a controller,
wherein the controller controls the stepping motor based on information sent from an image pickup apparatus configured to capture an object via an image pickup optical system that includes the focus lens, wherein in a case that the image pickup apparatus performs autofocusing in capturing a still image, the controller open-loop-controls the stepping motor in at least one of a drive start period and a drive stop period of the stepping motor, and feedback-controls the stepping motor using an output of the encoder between the drive start period and the drive stop period of the stepping motor, and wherein the controller open-loop-controls the stepping motor in a case that the image pickup apparatus performs the autofocusing in capturing a motion image.

2. The control unit for the stepping motor according to claim 1, wherein the image pickup apparatus further includes a display unit configured to display an image of the object, and wherein the controller open-loop-controls the stepping motor in a case that the image pickup apparatus is performing a live-view operation configured to sequentially display the image of the object on the display unit.

3. The control unit for the stepping motor according to claim 1, wherein the controller open-loop-controls the stepping motor in a case that the focus lens is driven by a manual focus method.

4. The control unit for the stepping motor according to claim 1, wherein the image pickup optical system is a variable-magnification optical system, and wherein the controller open-loop-controls the stepping motor in a case that the image pickup apparatus drives the focus lens for focusing caused by a magnification variation.

5. The control unit for the stepping motor according to claim 1, wherein the controller open-loop-controls the stepping motor in a case that the image pickup apparatus captures a motion image.

6. The control unit for the stepping motor according to claim 1, wherein in a case that the stepping motor reverses while the controller is open-loop-controlling the stepping motor, the controller turns to feedback-control the stepping motor.

7. The control unit for the stepping motor according to claim 1, further comprising a temperature detector configured to detect a temperature, wherein in a case that the temperature detected by the temperature detector becomes a predetermined temperature or lower while the controller is open-loop-controlling the stepping motor, the controller turns to feedback-control the stepping motor.

8. The control unit for the stepping motor according to claim 1, wherein the image pickup apparatus further includes a velocity instructor configured to instruct a target velocity of the stepping motor, and wherein in a case that the image pickup apparatus performs the autofocusing in capturing the still image and the target velocity instructed by the velocity instructor is higher than a threshold, the controller feedback-controls the stepping motor between the drive start period and the drive stop period of the stepping motor, and in a case that the image pickup apparatus performs the autofocusing in capturing the still image and the target velocity instructed by the velocity instructor is equal to or lower than the threshold, the controller open-loop-controls the stepping motor between the drive start period and the drive stop period of the stepping motor.

9. A control unit for a stepping motor configured to drive a focus lens, the control unit comprising:

an encoder configured to detect a rotational position of the stepping motor; and a controller, wherein the controller controls the stepping motor based on information sent from an image pickup apparatus configured to capture an object via an image pickup optical system that includes the focus lens, wherein the controller feedback-controls the stepping motor in a case that the image pickup apparatus performs autofocusing by a phase difference method, wherein in a case that the image pickup apparatus performs the autofocusing by a contrast method, the controller open-loop-controls the stepping motor in wobbling drive used to reciprocate the focus lens and feedback-controls the stepping motor in mountain-climbing drive used to drive the focus lens by a drive amount larger than that in the wobbling drive.

10. The control unit for the stepping motor according to claim 9, wherein the image pickup apparatus further includes a velocity instructor configured to instruct a target velocity of the stepping motor, and wherein in a case that the image pickup apparatus wobbles the focus lens for the autofocusing and the target velocity instructed by the velocity instructor is higher than a threshold, the controller feedback-controls the stepping motor, and in a case that the image pickup apparatus wobbles the focus lens for the autofocusing and the target velocity instructed by the velocity instructor is equal to or lower than the threshold, the controller open-loop-controls the stepping motor.

11. The control unit for the stepping motor according to claim 9, wherein the image pickup apparatus further includes a velocity instructor configured to instruct a target velocity of the stepping motor, and wherein in a case that the image pickup apparatus performs the autofocusing by the phase difference method and the target velocity indicated by the velocity instructor is higher than a threshold, the controller feedback-controls the stepping motor, and in a case that the image pickup apparatus performs the autofocusing by the phase difference method and the target velocity indicated by the velocity instructor is equal to or lower than the threshold, the controller open-loop-controls the stepping motor.

12. A control unit for a stepping motor configured to drive a focus lens, the control unit comprising:

an encoder configured to detect a rotational position of the stepping motor; and a controller, wherein the controller controls the stepping motor based on information sent from an image pickup apparatus configured to capture an object via an image pickup optical system that includes the focus lens, wherein the image pickup apparatus includes a moving-object detector configured to determine whether the object is moving, and wherein the controller open-loop-controls the stepping motor in a case that the image pickup apparatus performs autofocusing and the object is moving, and the controller feedback-controls the stepping motor in a case that the image pickup apparatus performs the autofocusing and the object is not moving.

13. The control unit for the stepping motor according to claim 12, wherein the image pickup apparatus further includes a velocity instructor configured to instruct a target velocity of the stepping motor, and wherein in a case that the object is not moving and the target velocity instructed by the velocity instructor is higher than a threshold, the controller feedback-controls the stepping motor, and in a case that the object is not moving and the target velocity instructed by the velocity instructor is equal to or lower than the threshold, the controller open-loop-controls the stepping motor.

14. An optical apparatus comprising:
a stepping motor configured to drive a focus lens; and
a control unit for the stepping motor, the control unit including an encoder configured to detect a rotational position of the stepping motor, and a controller,
wherein the controller controls the stepping motor based on information sent from an image pickup apparatus configured to capture an object via an image pickup optical system that includes the focus lens,
wherein in a case that the image pickup apparatus performs autofocusing in capturing a still image, the controller open-loop-controls the stepping motor in at least one of a drive start period and a drive stop period of the stepping motor, and feedback-controls the stepping motor using an output of the encoder between the drive start period and the drive stop period of the stepping motor, and
wherein the controller open-loop-controls the stepping motor in a case that the image pickup apparatus performs the autofocusing in capturing a motion image.

15. An optical apparatus comprising:
a stepping motor configured to drive a focus lens; and
a control unit for the stepping motor, the control unit including an encoder configured to detect a rotational position of the stepping motor, and a controller,
wherein the controller controls the stepping motor based on information sent from an image pickup apparatus configured to capture an object via an image pickup optical system that includes the focus lens,
wherein the controller feedback-controls the stepping motor in a case that the image pickup apparatus performs autofocusing by a phase difference method,
wherein in a case that the image pickup apparatus performs the autofocusing by a contrast method, the controller open-loop-controls the stepping motor in wobbling drive used to reciprocate the focus lens and feedback-controls the stepping motor in mountain-climbing drive used to drive the focus lens by a drive amount larger than that in the wobbling drive.

16. An optical apparatus comprising:
a stepping motor configured to drive a focus lens; and
a control unit for the stepping motor, the control unit including an encoder configured to detect a rotational position of the stepping motor, and a controller,
wherein the controller controls the stepping motor based on information sent from an image pickup apparatus configured to capture an object via an image pickup optical system that includes the focus lens,
wherein the image pickup apparatus includes a moving-object detector configured to determine whether the object is moving, and
wherein the controller open-loop-controls the stepping motor in a case that the image pickup apparatus performs autofocusing and the object is moving, and the controller feedback-controls the stepping motor in a case that the image pickup apparatus performs autofocusing and the object is not moving.

17. A method of controlling a stepping motor configured to drive a focus lens based on information sent from an image pickup apparatus by using an encoder configured to detect a rotational position of the stepping motor, the method comprising the steps of:
open-loop-controlling the stepping motor in at least one of a drive start period and a drive stop period of the stepping motor and feedback-controlling the stepping motor using an output of the encoder between the drive start period and the drive stop period of the stepping motor in a case that the image pickup apparatus performs autofocusing in capturing a still image; and
open-loop-controlling the stepping motor in a case that the image pickup apparatus performs the autofocusing in capturing a motion image.

18. A method of controlling a stepping motor configured to drive a focus lens based on information sent from an image pickup apparatus by using an encoder configured to detect a rotational position of the stepping motor, the method comprising the steps of:
feedback-controlling the stepping motor in a case that the image pickup apparatus performs autofocusing by a phase difference method;
open-loop-controlling the stepping motor in wobbling drive used to reciprocate the focus lens, and feedback-controlling the stepping motor in mountain-climbing drive used to drive the focus lens by a drive amount larger than that in the wobbling drive, in a case that the image pickup apparatus performs the autofocusing by a contrast method.

19. A method of controlling a stepping motor configured to drive a focus lens, based on information sent from an image pickup apparatus configured to capture an object, by using an encoder configured to detect a rotational position of the stepping motor, the method comprising the step of:
open-loop-controlling the stepping motor in a case that the image pickup apparatus performs autofocusing and the object is moving, and feedback-controlling the stepping motor, in a case that the image pickup apparatus performs the autofocusing and the object is not moving.

* * * * *